Dec. 20, 1966 A. HAHNEL 3,293,562
PARALLEL REDUNDANT CRYSTAL OSCILLATOR
Filed March 17, 1965
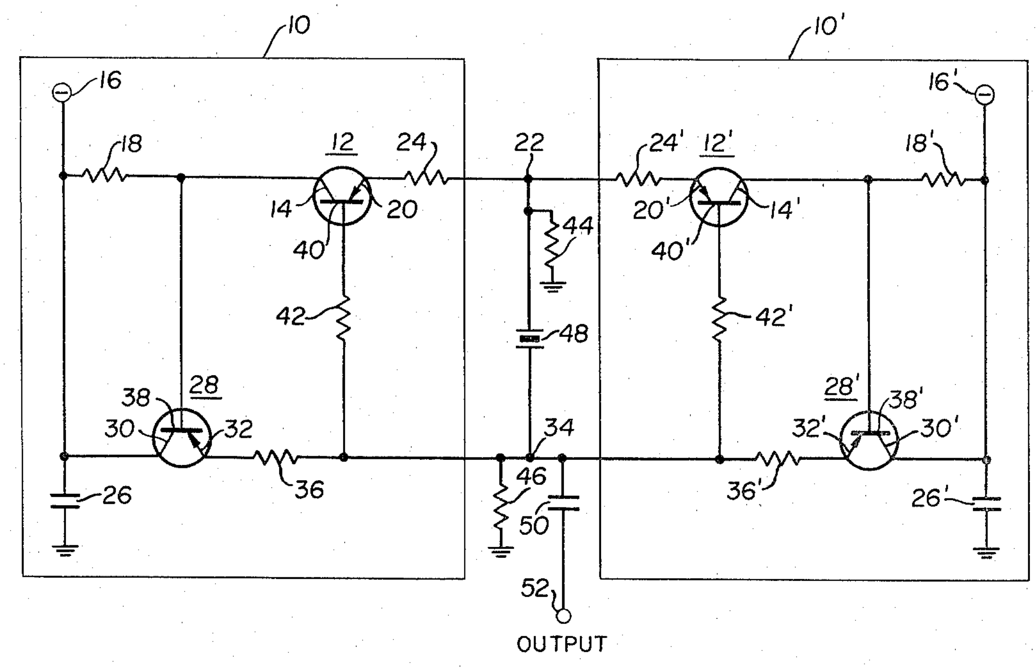
INVENTOR
ALWIN HAHNEL
BY George J. Seligsohn
ATTORNEY United States Patent Office 3,293,562
Patented Dec. 20, 1966

3,293,562
PARALLEL REDUNDANT CRYSTAL OSCILLATOR

Alwin Hahnel, Rochester, N.Y., assignor to Stromberg-Carlson, Rochester, N.Y., a corporation of Delaware Filed May 17, 1965, Ser. No. 456,152
4 Claims. (Cl. 331—56)

This invention relates to frequency generating apparatus and, more particularly, to such apparatus comprising a parallel redundant crystal oscillator.

Many systems, such as time division multiplex communication systems, for instance, require a continuous and uninterrupted series of accurately timed periodic clock pulses for synchronization purposes. In fact, often the loss of a single clock pulse may be fatal to the operation of the whole system. Such systems incorporate a master oscillator from which the needed clock pulses are normally derived. Since this master oscillator, like all apparatus, is subject to possible failure, it is the practice, in the prior art, to provide a standby oscillator which is substituted automatically for the master oscillator in response to failure of the master oscillator. Since the respective frequencies of the oscillations produced by two independent oscillators, even if they have the same nominal frequencies, will never in fact be identical to each other, a sharp frequency transient is produced when the system switches to the standby oscillator in response to the failure of the master oscillator. This frequency transient can easily result in the loss or improper timing of a clock pulse derived therefrom, with disastrous consequences to the system as a whole.

Therefore, in the prior art, in order to somewhat minimize the effect of such a frequency transient, the frequency of the oscillations of the standby oscillator may be normally synchronized or entrained by the master oscillator, such synchronization being removed in response to the substitution of the standby oscillator for the master oscillator in the system.

It will be seen that, in the prior art, equipment is needed to sense the failure of the master oscillator, to automatically switch the system from the master oscillator to the standby oscillator in response to the failure of the master oscillator being sensed, and to synchronize the standby oscillator with the master oscillator prior to the standby-oscillator being switched into the system. All of this needed equipment, of course, increases to a large extent the complexity of the pulse generating means of the system. Furthermore, even if all the above set forth precautions for avoiding a frequency transient are taken, the mere act of switching the system from one oscillator to another has the tendency to produce some unwanted transients which may disrupt the operation of the system.

The present invention does away with the need for automatically switching the system from a master oscillator to a standby oscillator in response to the failure of the master oscillator being sensed. More particularly, in the present invention, two effectively independent amplifiers are connected in parallel to common positive feedback frequency-determining means comprising a single quartz crystal. Either amplifier, operating alone, provides sufficient positive feedback to establish and sustain oscillations of enough power to derive therefrom the required system clock pulses. Each of the two amplifiers is designed to provide isolation therebetween so that a short circuit in the active elements of either one thereof does not cause a complete breakdown of the output voltage, but permits the other one thereof together with the common frequency-determining means to provide oscillations of sufficient power to derive the needed clock pulses. It has been computed that where the failure rate of each of the two individual amplifiers, taken as a unit, is 4780 in $10^8$ hours, the parallel redundant circuitry provided by the present invention will have a mean-time between failures, under identical conditions, of approximately 200 years. Due to this minute failure rate, no standby oscillator is required when the parallel redundant crystal oscillator of the present invention is employed as the master oscillator of a system.

It is, therefore, an object of the present invention to provide an improved frequency source wherein the output of said source is not significantly disturbed by faults occurring within the source.

It is a more particular object of the present invention to provide such a frequency source which employs two parallel-connected amplifiers together with a single common positive feedback frequency-determining means.

These and other objects, features and advantages of the present invention will become more apparent from the following detailed description, taken together with the accompanying drawing, in which the sole figure is a schematic circuit diagram of a preferred embodiment of the invention.

Referring now to the drawing, there is shown a first amplifier 10 comprising a first transistor 12 having its collector 14 connected to a point of negative potential 16 through a first resistance 18 and its emitter 20 connected to a first common point 22 through a second resistance 24. As shown, the point of negative potential is connected to a point of reference potential through first capacitance 26. First amplifier 10 further comprises a second transistor 28 having its collector 30 connected directly to the point of negative potential 16 and having its emitter 32 connected to a second common point 34 through a third resistance 36. The collector 14 of first transistor 12 of the first amplifier 10 is connected directly to the base 38 of the second transistor 28 of the first amplifier 10 and the second common point 34 is connected to the base 40 of the first transistor 14 of the first amplifier 10 through a fourth resistance 42.

The elements of the second amplifier 10', which is identical in structure and function with the first amplifier 10, are respectively indicated by primed referenced numerals which are identical to the corresponding elements of first amplifier 10.

The common frequency-determining means includes a fifth resistance 44 connecting the first common point 22 to the point of reference potential, a sixth resistance 46 connecting the second commond point 34 to the point of reference potential, and a quartz crystal 48, for determining the frequency of oscillations, connected between the first common point 22 and the second common point 34. The parallel redundant oscillator of the present invention further includes a second capacitance 50 connecting the second common point 34 to the output terminal 52 of the oscillator.

Considering now the inherent operation of the above-described parallel redundant crystal oscillator, the output of the voltage amplifier consisting of first transistor 12 of amplifier 10 is power amplified, but not voltage amplified, by the emitter follower comprising second transistor 28 of amplifier 10. A portion of the output of this emitter follower, which has a relatively low output impedance, is positively fed back to the emitter circuit of the voltage amplifier by quartz crystal 48 of the frequency-determining means. Since quartz crystal 48 has a low impedance only at its resonant frequency, the only frequency component at the output of the emitter follower which is effectively fed back therethrough is that which is substantially at the natural frequency of quartz crystal 48. Therefore, amplifier 10 together with quartz crystal 48, taken as a unit, will form an oscillator which will oscillate at a frequency substantially equal to the resonant frequency of quartz crystal 48.

In a similar manner, amplifier 10' together with quartz crystal 48, taken as a unit, will also form an oscillator which will oscillate at a frequency substantially equal to the resonant frequency of quartz crystal 48.

When both amplifiers 10 and 10' are properly operating, and no failure has occurred, oscillations present at second common point 34 will be applied through second capacitance 50 to output terminal 52, second capacitance 50 serving the purpose of blocking the D.C. potential present at the second common point 34 while permitting the oscillations thereat to pass therethrough. Under these conditions, both amplifiers 10 and 10', operating in parallel, contribute to the power of the oscillations forwarded to output terminal 52.

If amplifier 10 should fail, due to a short circuit in either first transistor 12 or second transistor 28, the presence of second resistance 24 in the emitter circuit of transistor 12 and the presence of third resistance 36 in the emitter circuit of transistor 28 will provide isolation to prevent such a short circuit in either or both transistors 12 and/or 28 from being extended to either first common point 22 or second common point 34. Therefore, under these conditions, amplifier 10' together with quartz crystal 48, taken as a unit, will continue to provide oscillations at output terminal 52. The power of the oscillations provided under these conditions is still sufficient, despite the failure of amplifier 10, to derive therefrom proper clock pulses.

For identical reasons, oscillations of sufficient power will be provided at output terminal 52 by amplifier 10 together with quartz crystal 48, taken as a unit, in case of the failure of amplifier 10'.

Although only a preferred embodiment of this invention has been described herein, it is not intended that the invention be restricted thereto, but that it be limited only by the true spirit and scope of the appended claims.

What is claimed is:

1. A parallel redundant oscillator comprising a first common point; a second common point; first and second amplifiers, each of said first and second amplifiers including first and second active elements each having an input electrode, an output electrode and a control electrode, a first resistance coupling the output electrode of said first active element to a point of fixed operating potential, a second resistance coupling the input electrode of said first active element to said first common point, means for directly coupling the output electrode of said second active element to said point of fixed operating potential, a third resistance coupling the input electrode of said second active element to said second common point, means for directly coupling the output electrode of said first active element to the control electrode of said second active element, and a fourth resistance coupling said second common point to the control electrode of said first active element; and common means including a fifth resistance coupling said first common point to a point of reference potential, a sixth resistance coupling said second common point to said point of reference potential, and a frequency-determining crystal coupling said first and second common points.

2. The oscillator defined in claim 1, wherein each of said first and second amplifiers further includes a capacitance having a low impedance at the operating frequency of said oscillator coupling said fixed point of operating potential to said point of reference potential.

3. The oscillator defined in claim 1, further including an output terminal for said oscillator, and a capacitance coupling said second common point to said output terminal.

4. A parallel redundant oscillator comprising a first common point and a second common point, first and second amplifier means and frequency determining means connected in parallel between said first and second common points for generating a signal of predetermined frequency, each of said first and second amplifier means including a voltage amplifier having an input connected to said first common point and an output, and a current amplifier having an output connected to said second common point and an input connected to the output of said voltage amplifier, a first isolation resistor connected between the input of said voltage amplifier and said first common point, and a second isolation resistor connected between the output of said current amplifier and said second common point.

References Cited by the Examiner

UNITED STATES PATENTS 1,711,969 5/1929 Round ............ 330—124

FOREIGN PATENTS 667,284 2/1952 Great Britain.

NATHAN KAUFMAN, *Primary Examiner.*

J. KOMINSKI, *Assistant Examiner.*